US006597737B1

(12) United States Patent
Kondo et al.

(10) Patent No.: US 6,597,737 B1
(45) Date of Patent: Jul. 22, 2003

(54) MOTION DETERMINING APPARATUS, METHOD THEREOF, AND PICTURE INFORMATION CONVERTING APPARATUS

(75) Inventors: Tetsujiro Kondo, Tokyo (JP); Yasushi Tatehira, Kanagawa (JP); Masashi Uchida, Tokyo (JP); Nobuyuki Asakura, Tokyo (JP); Takuo Morimura, Kanagawa (JP); Kazutaka Ando, Kanagawa (JP); Hideo Nakaya, Kanagawa (JP); Tsutomu Watanabe, Kanagawa (JP); Satoshi Inoue, Kanagawa (JP); Wataru Niitsuma, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/387,994

(22) Filed: Sep. 1, 1999

(30) Foreign Application Priority Data

Sep. 3, 1998 (JP) ............................................. 10-249448

(51) Int. Cl.[7] ........................... H04N 7/12; H04N 11/04; H04N 11/02
(52) U.S. Cl. .............................. 375/240.12; 375/240.13; 375/240.14; 375/240.15; 375/240.16; 375/240.17
(58) Field of Search ..................... 375/240.12, 240.14, 375/97, 98, 416, 240.13, 240.15, 240.16, 240.17; 358/182, 133

(56) References Cited

U.S. PATENT DOCUMENTS

| 4,924,305 | A |   | 5/1990  | Nakagawa et al. |         |
|-----------|---|---|---------|-----------------|---------|
| 5,049,990 | A | * | 9/1991  | Kondo           | 358/133 |
| 5,245,436 | A | * | 9/1993  | Alattar         | 358/182 |
| 5,459,517 | A | * | 10/1995 | Kunitake        | 348/416 |
| 5,508,750 | A | * | 4/1996  | Hewlett et al.  | 348/558 |
| 5,515,114 | A | * | 5/1996  | Murata          | 348/699 |
| 5,539,466 | A | * | 7/1996  | Igarashi et al. | 348/401 |
| 5,563,651 | A | * | 10/1996 | Christopher     | 348/97  |
| 5,903,481 | A | * | 5/1999  | Kondo           | 364/724.1 |
| 5,909,511 | A | * | 6/1999  | Yoshimoto       | 382/236 |
| 5,946,044 | A |   | 8/1999  | Kondo et al.    |         |
| 6,084,641 | A | * | 7/2000  | Wu              | 348/722 |
| 6,104,755 | A | * | 8/2000  | Ohara           | 375/240 |
| 6,108,449 | A | * | 8/2000  | Sekiguchi et al. | 382/236 |
| 6,201,833 | B1 | * | 3/2001 | Kondo et al.    | 375/240.1 |
| 6,226,327 | B1 | * | 5/2001 | Igarashi        | 375/240.14 |

* cited by examiner

Primary Examiner—Chris Kelley
Assistant Examiner—Charles E Parsons
(74) Attorney, Agent, or Firm—Frommer Lawrence & Haug LLP; William S. Frommer

(57) ABSTRACT

A motion determining apparatus for detecting a motion of a partial picture of an input picture signal is disclosed, that comprises a first motion detecting portion for comparing a frame difference detected for the partial picture with a predetermined threshold value and determining that the partial picture has a motion when the frame difference is larger than the threshold value, a second motion detecting portion for comparing a frame difference detected for the partial picture with a predetermined threshold value, comparing a field difference detected for the partial picture with a predetermined threshold value, and determining that there is a motion of an artificial picture when the frame difference and the field difference are larger than the respective threshold values, and an output portion for forming motion determination data with determination data that is output from the first motion detecting portion and the second motion detecting portion.

12 Claims, 13 Drawing Sheets

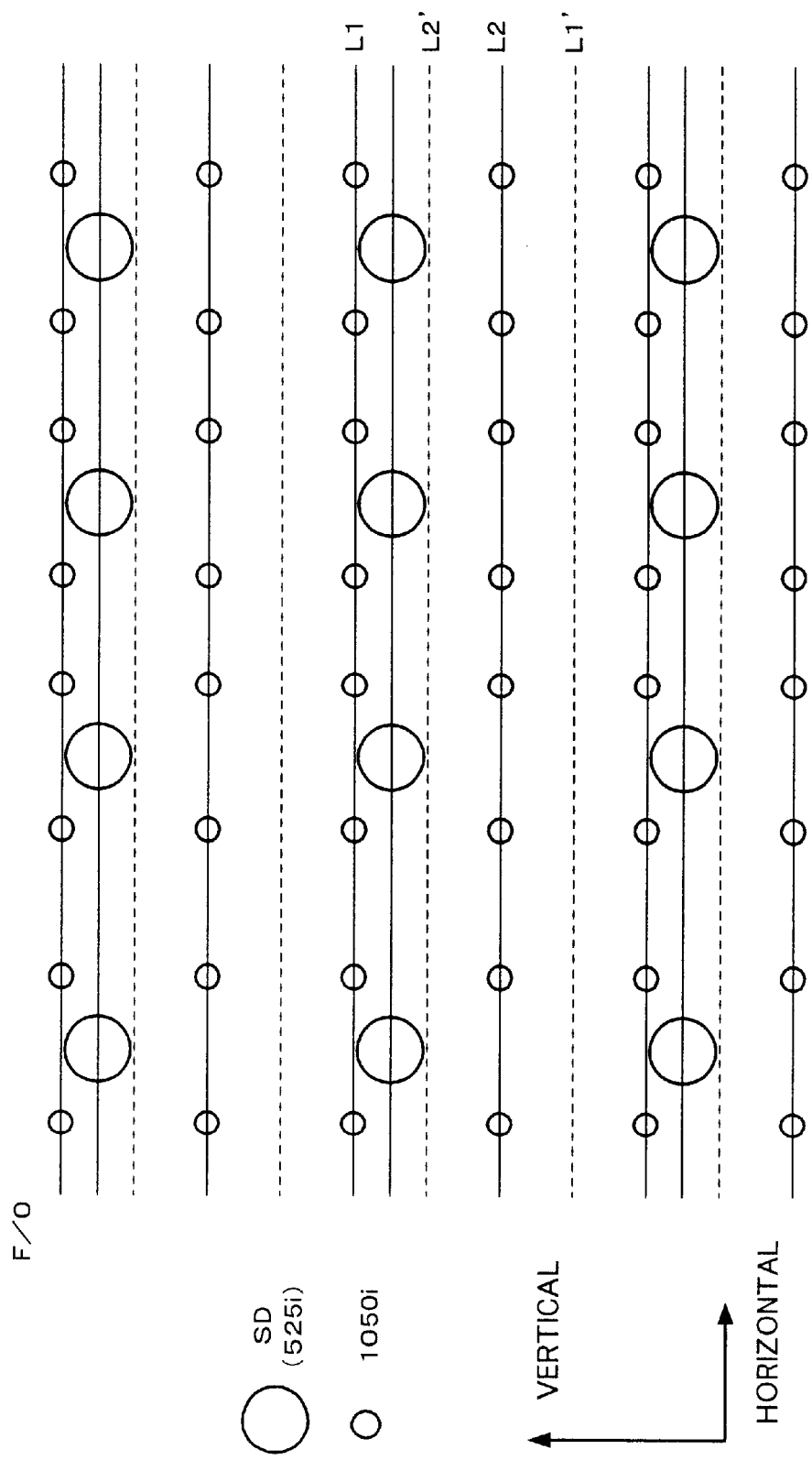

CLASS CATEGORIZATION PROCESS

NON-EDGE MATCHING
ADRC PROCESS

MOTION DETERMINING APPARATUS, METHOD THEREOF, AND PICTURE INFORMATION CONVERTING APPARATUS

BACKGROUND OF THE INVENTION

1. Field of the Invention

The present invention relates to a motion determining apparatus, a motion determining method, and a picture information converting apparatus.

2. Description of the Related Art

In a picture signal converting apparatus that converts an input digital picture signal into a picture signal with a different scanning line structure or in a picture process using a highly efficient code for compressing a digital picture signal, a motion determining process for determining whether or not a considered portion of a picture has a motion is used. In a conventional motion determining apparatus, the sum of the absolute values of differences between a picture portion (for example, a block of one frame) of one frame and the same picture portion of an adjacent frame. When the sum is larger than a predetermined threshold value, it is determined that the picture portion has a motion. In contrast, when the sum is equal to or smaller than the predetermined threshold value, it is determined that the picture portion does not have a motion.

In the conventional motion determining process, since differences between adjacent frames are used, when a telop (television opaque projector) is moving, it may not be correctly detected as a moving picture. A telop is a sequence of characters and/or symbols superimposed with a picture. For example, when a character is horizontally moved, if one character element thereof overlaps with another character element one frame later, in a middle field of the frame, even if the current picture largely varies from a picture of a chronologically preceding field, since frame differences are small, the current picture is determined as a still picture. If a picture process is performed corresponding to the determined result, the smooth motion of the picture is lost. Thus, the processed result becomes unnatural. On the other hand, when a still picture is processed as a moving picture, the resultant picture becomes dim.

OBJECTS AND SUMMARY OF THE INVENTION

An object of the present invention is to provide a motion determining apparatus, a motion determining method, and a picture information converting apparatus that allow a motion determining process for an artificial picture such as a telop to be separately performed from a motion determining process for other than a telop so as to properly perform a motion adaptive process.

A first aspect of the present invention is a motion determining apparatus for detecting a motion of a partial picture of an input picture signal, comprising a first motion detecting portion for comparing a frame difference detected for the partial picture with a predetermined threshold value and determining that the partial picture has a motion when the frame difference is larger than the threshold value, a second motion detecting portion for comparing a frame difference detected for the partial picture with a predetermined threshold value, comparing a field difference detected for the partial picture with a predetermined threshold value, and determining that there is a motion of an artificial picture when the frame difference and the field difference are larger than the respective threshold values, and an output portion for forming motion determination data with determination data that is output from said first motion detecting portion and said second motion detecting portion.

A second aspect of the present invention is a motion determining method for detecting a motion of a partial picture of an input picture signal, comprising the steps of (a) comparing a frame difference detected for the partial picture with a predetermined threshold value and determining that the partial picture has a motion when the frame difference is larger than the threshold value, (b) comparing a frame difference detected for the partial picture with a predetermined threshold value, comparing a field difference detected for the partial picture with a predetermined threshold value, and determining that there is a motion of an artificial picture when the frame difference and the field difference are larger than the respective threshold values, and (c) forming motion determination data with determination data that is output at steps (a) and (b).

A third aspect of the present invention is a picture information converting apparatus for converting an input picture signal into a plurality of output picture signals with different scanning line structures, comprising a first data selecting means for selecting a plurality of first pixels of the input picture signal, the positions of the first pixels being present in the vicinity of pixels of an output picture signal to be generated, a second data selecting means for selecting a plurality of second pixels of the input picture signal, the positions of the second pixels being present in the vicinity of pixels of an output picture signal to be generated, a third data selecting means for selecting a plurality of third pixels of the input picture signal, the positions of the third pixels being present in the vicinity of pixels of an output picture signal to be generated, a memory means for storing pre-obtained estimation expression coefficients, a signal generating means for generating pixels of an output picture signal with the plurality of first pixels selected by said first data selecting means and a linear estimation expression of the estimation expression coefficients, a class determining means for forming a spatial class corresponding to the plurality of second pixels selected by said second data selecting means, forming a motion class corresponding to the plurality of third pixels selected by said third data selecting means, and supplying the estimation coefficients to said signal generating means corresponding to class information as a combination of the spatial class and the motion class, a scanning line structure converting means, connected to said signal generating means, for converting the input picture signal into an output picture signal with a designated scanning line structure, and a motion determining portion for forming the motion class, wherein said motion determining portion has a first motion detecting portion for comparing a frame difference detected for the partial picture with a predetermined threshold value and determining that the partial picture has a motion when the frame difference is larger than the threshold value, a second motion detecting portion for comparing a frame difference detected for the partial picture with a predetermined threshold value, comparing a field difference detected for the partial picture with a predetermined threshold value, and determining that there is a motion of an artificial picture when the frame difference and the field difference are larger than the respective threshold values, and an output portion for forming motion determination data with determination data that is output from said first motion detecting portion and said second motion detecting portion.

According to the present invention, since a motion detecting process for an artificial picture such as a telop is separately performed from a motion detecting process for other than a telop, the motion of the telop and so forth can be accurately detected. Thus, when the motion adaptive process is performed, the resultant picture can be prevented from deteriorating.

According to the picture information converting apparatus of the present invention, classes are detected corresponding to a plurality of pixels of an input picture signal. Pixel values are generated with estimation predictive expressions that are optimum for the individual classes. Thus, the picture information converting apparatus can generate a still picture and a moving picture with higher picture quality than the conventional apparatus. In addition, motion information is placed in class information. Thus, it is not necessary to determine whether the current picture is a still picture or a moving picture. In addition, it is not necessary to perform a switching operation of the apparatus corresponding to the detected result. Thus, the difference of the picture quality in the switching operation can be prevented. In addition, the picture quality can be remarkably suppressed from deteriorating against a motion detection error.

The following prior art references have been filed by the applicant of the present invention.
(1) Japanese Patent Application No. H09-115437 (US application corresponding thereto is now pending);
(2) Japanese Patent Application No. H10-209346 (US application corresponding thereto is now pending); and
(3) Japanese Patent Application No. H10-228221 (US application corresponding thereto is now pending).

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 14 is a schematic diagram for explaining the relation of positions of SD pixels and 1050$i$ pixels;

DETAILED DESCRIPTION OF THE PREFERRED EMBODIMENT

Figure 1:
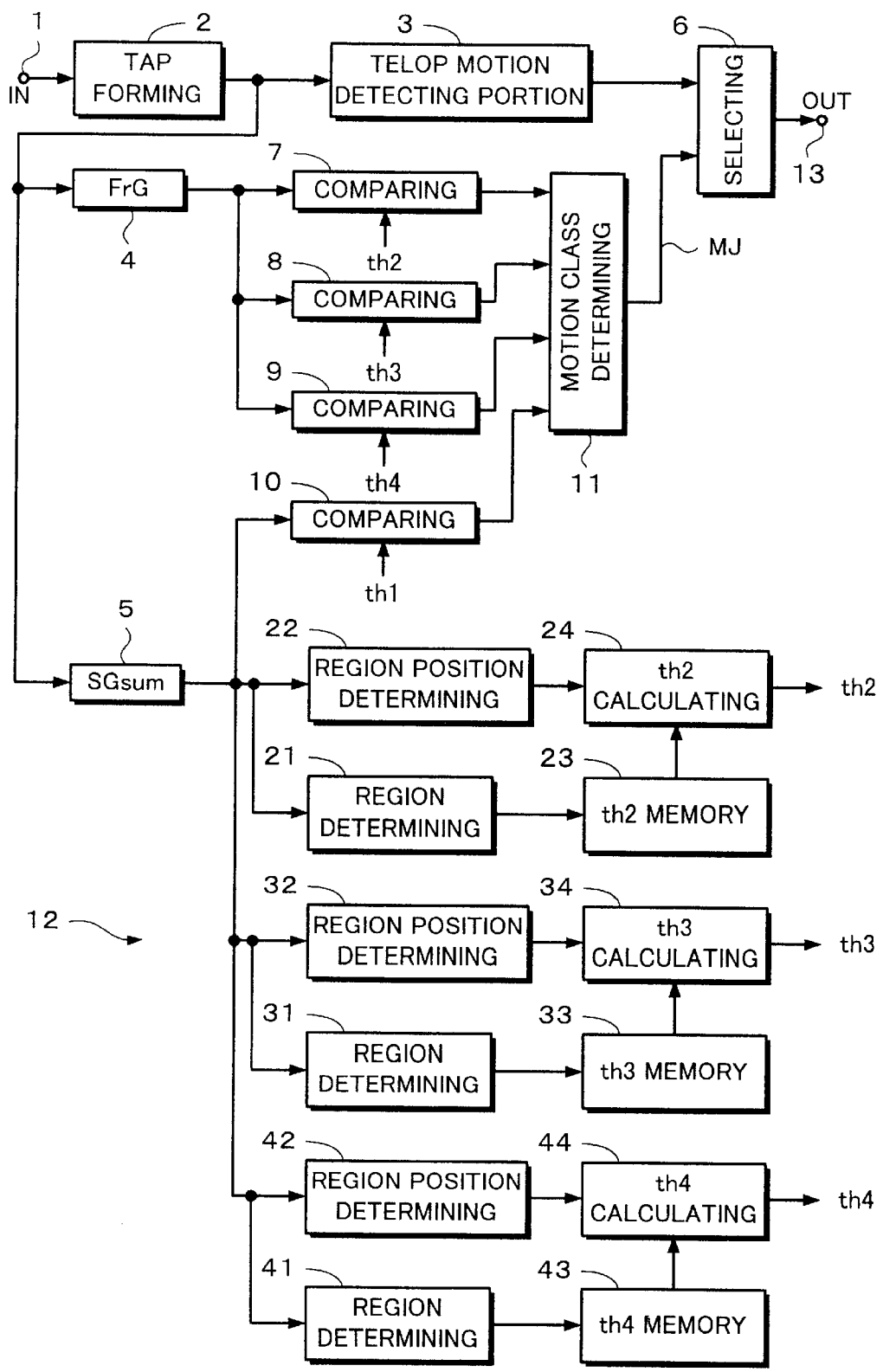
FIG. 1 is a block diagram showing the structure of a motion determining apparatus according to an embodiment of the present invention.
Figure 2:
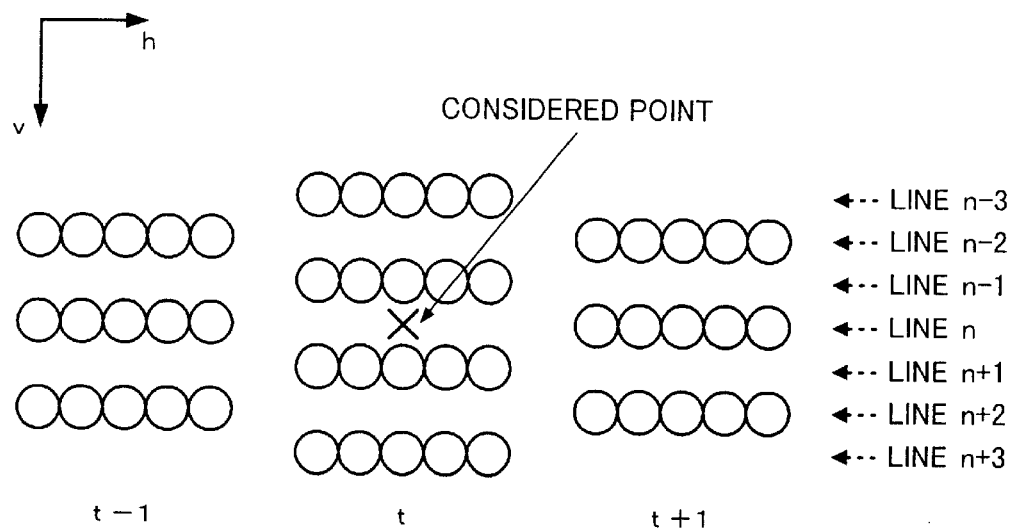
FIG. 2 is a schematic diagram showing taps used for the motion determining process according to the embodiment of the present invention.

Next, with reference to the accompanying drawings, an embodiment of the present invention will be described. FIG. 1 is a block diagram showing the structure of a motion determining apparatus according to an embodiment of the present invention. Referring to FIG. 1, an input digital picture signal is received from an input terminal 1 and supplied to a tap forming circuit 2. In this example, the input digital picture signal is an interlace signal. The tap forming circuit 2 selects 50 pixels shown in FIG. 2 as taps used for the motion determining process and outputs the selected taps. FIG. 2 shows pictures of the same spatial position of three fields at chronologically successive times t−1, t, and t+1. Dots in FIG. 2 represent pixels sampled at a predetermined frequency. For example, one pixel represents an eight-bit luminance value.

In the field at time t−1, five taps of positions are selected from each of chronologically successive three lines. Likewise, in the field at time t+1, five taps of positions are selected from each of chronologically successive three lines. The spatial positions of the fields of these fields are the same. In the current field at time t, five taps are selected from chronologically successive four lines. Because of the interlace system, the four lines of the current field at time t spatially deviate by one line from the taps of the fields at times t−1 and t+1. In FIG. 2, a position denoted by X represents a considered point. With respect to the considered point, the motion determining process is performed.

The tap forming circuit 2 is connected to a telop motion detecting portion 3, a frame difference FrG detecting circuit 4, and a space slope SGsum detecting circuit 5. A selecting circuit 6 is connected to the telop motion detecting portion 3. Comparing devices 7, 8, and 9 are connected to the frame difference FrG detecting circuit 4. The comparing device 7 compares a frame difference FrG with a threshold value th2. The comparing device 8 compares the frame difference FrG with a threshold value th3. The comparing device 9 compares the frame difference FrG with a threshold value th4. A comparing device 10 is connected to the space slope SGsum detecting circuit 5. The comparing device 10 compares the space slope SGsum with a threshold value th1.

When the input value (FrG) of the comparing device 7 is larger than the threshold value (th2), the comparing device 7 outputs "1". Otherwise, the comparing device 7 outputs "0". When the input value (FrG) of the comparing device 8 is larger than the threshold value (th3), the comparing device 8 outputs "1". Otherwise, the comparing device 8 outputs "0". When the input value (FrG) of the comparing device 9 is larger than the threshold value (th4), the comparing device 9 outputs "1". Otherwise, the comparing device 9 outputs "0". When the input value (SGsum) of the comparing device 10 is larger than the threshold value (th1), the comparing device 10 outputs "1". Otherwise, the comparing device 10 outputs "0". Thus, when FrG≦th2, the comparing device 7 outputs "1". When FrG<th2, the comparing device 7 outputs "0". A threshold value generating portion 12 is connected to the space slope SGsum detecting circuit 5. The relation of the threshold values is th2>th3>th4. The operation of the threshold value generating portion 12 will be described later.

The frame difference FrG is obtained by calculating the differences between the pixel values of 15 taps of the field at time t−1 and the pixel values of 15 taps of the field at time t+1 (the spatial positions of the 15 taps of the field at time t−1 are the same as the spatial positions of the 15 taps of the field at time t+1), converting the obtained 15 frame difference values into the absolute values, and adding the absolute values. Generally, the amount of the motion between adjacent frames is proportional to the frame difference FrG.

The space slope SGsum is the sum of the space slope SG(t−1) of the field at time t−1, the space slope SG(t) of the field at time t, and the space slope SG(t+1) of the field at time t+1. These space slopes are apace activities. The space slope of each field is obtained by calculating the difference values between pixels of adjacent fields and adding the absolute values of the difference values. In the case of a particular pixel at the upper left corder of the field at time t−1, the pixel immediately below the particular pixel and the pixel on the right of the particular pixel are adjacent pixels. The difference between the pixel value of the particular pixel and the pixel value of each of the adjacent pixels is calculated. Likewise, the difference between the pixel value of a particular pixel and each of vertical and horizontal adjacent pixels is calculated. By adding the differences of the 15 pixels, the space slope SG(t−1) of the field at time t−1 is obtained. Likewise, the slope SG(t) of the field at time t and the slope SG(t+1) of the field at time t+1 are obtained.

The compared results of the comparing devices 7, 8, and 9 are supplied to a motion class determining portion 11. The motion class determining portion 11 receives the compared results of the comparing devices 7, 8, 9, and 10 and generates a motion class MJ that is for example a three-bit code. The value of the motion class MJ is one of 0, 1, 2, and 3. When the motion class MJ is 3, the motion is a considered point is the largest. The motion class MJ determining portion 11 determines the motion class MJ corresponding to the following conditions and supplies the determined motion class MJ to the selecting circuit 6.

Figure 3:
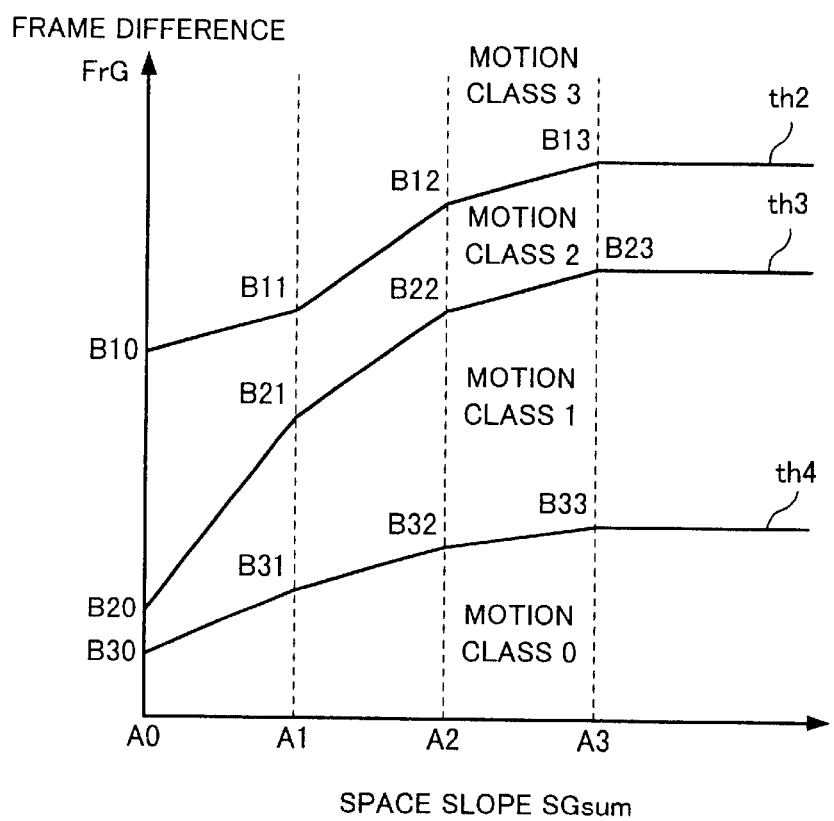
FIG. 3 is a schematic diagram for explaining threshold values according to the embodiment of the present invention.

Motion class MJ=3: SGsum≧th1 AND FrG≧th2
Motion class MJ=2: SGsum>th1 AND FrG≧th3
Motion class MJ=1: SGsum≧th1 AND FrG≧th4
Motion class MJ=0: except for above-conditions As shown in FIG. 3, the threshold value generating portion 12 generates the threshold values th2, th3, and th4 that vary corresponding to the value of the space slope SGsum. Although the threshold values independently vary, they are proportional to the space slope SGsum. The generated threshold values th2, th3, and th4 are supplied to the comparing devices 7, 8, and 9, respectively. The comparing devices 7, 8, and 9 compare the threshold values th2, th3, and th4 with the frame difference FrG, respectively. Thus, corresponding to the above-described conditions, four types of motion classes MJ are determined. The threshold value th1 is properly designated so as to detect that the space slope SGsum of a particular partial picture as an object of the motion determining process is larger than a particular value.

To generate the threshold value th2, a region determining circuit 21, a region position determining circuit 22, a memory 23, and a th2 calculating circuit 24 are disposed.

The space slope SGsum is supplied to the region determining circuit 21 and the region position determining circuit 22. The memory 23 outputs a parameter corresponding to output data of the region determining circuit 21. The th2 calculating circuit 24 receives output data of the region position determining circuit 22 and the parameter that is output from the memory 23 and generates the threshold value th2. As shown in FIG. 3, four regions are defined by values represented by A0, A1, A2, and A3 of the space slope SGsum. The three regions (A0–A1), (A1–A2), and (A2–A3) have the same width. In a region of SGsum>A3, it is assumed that the threshold values th2, th3, and th4 are saturated. The region determining circuit 21 determines one of the four regions.

In addition, threshold value levels B10, B11, B12, and B13 are defined corresponding to the values A0, A1, A2, and A3 of the space slope SGsum, respectively. These levels are output from the memory 23. In the region (A0–A1), the levels B10 and B11 are output from the memory 23 to the threshold value calculating circuit 24. Each of the three regions is equally divided by for example 64. The region position determining circuit 22 determines a position in a region. When the region position determining circuit 22 has determined a position in a region, the threshold value calculating circuit 24 performs linear compensating process and generates the threshold value th2. For example, at a position in the region (A0–A1), a coefficient corresponding to the position is multiplied by the levels B10 and B11 and the multiplied results are added. Thus, the threshold value th2 is obtained.

To generate the threshold value th3, a region determining circuit 31, a region position determining circuit 32, a memory 33, and a calculating circuit 34 are disposed. To generate the threshold value th4, a region determining circuit 41, a region position determining circuit 42, a memory 43, and a calculating circuit 44 are disposed. These structures operate in the same manner as the structure for generating the threshold value th2. However, the memory 34 stores levels B20, B21, B22, and B23 of the threshold value th3. The memory 44 stores levels B30, B31, B32, and B33 of the threshold value th4.

The determined motion class MJ is supplied to the selecting circuit 6. The selecting circuit 6 selects the telop determined data received from the telop motion detecting portion 3 or the motion class MJ received from the motion class determining portion 11. The selecting circuit 6 supplies the selected data to an output terminal 13. For example, one class (mono class) is assigned to the telop determined data. When condition A or B is satisfied, the telop determined data represents that there is a motion of a telop portion.

When the telop determined data represents that there is a motion of a telop portion, the selecting circuit 6 outputs the telop determined data with high priority. When the telop determined data represents that there is no motion of a telop portion, the selecting circuit 6 outputs the motion class MJ. The motion class determining portion 11 may be connected to a majority determining portion so as to determine the final motion class corresponding to the rule of majority. By the majority determining process, isolated points of motion classes can be removed. Thus, the conformation of motion classes in spatially adjacent regions can be improved.

The telop determined data may be treated as a part of motion classes rather than a mono class. In this case, classes are determined corresponding to the following conditions.

When condition A or B is satisfied, the telop determined data represents that there is a motion of a telop portion. When neither condition A nor B is satisfied, the telop determined data represents that there is no motion of a telop portion.

Motion class MJ=3: A AND B AND FrG≧th2

Motion class MJ=2: SGsum≧th1 AND FrG≧th3

Motion class MJ=1: SGsum≧th1 AND FrG≧th4

Motion class MJ=0: Except for above-conditions

Next, the operation of the telop motion detecting portion 3 will be described. As was mentioned above, a telop is a sequence of characters and/or symbols superimposed with a picture. However, the present invention can be applied for a detecting process for pictures of video games, computer graphics, and so forth as well as the above-described telop. In other words, these pictures have common characteristics as picture signals of which pixels with constant luminance are chronologically and spatially successive and that represent characters, symbols, and/or graphics.

Figure 4:
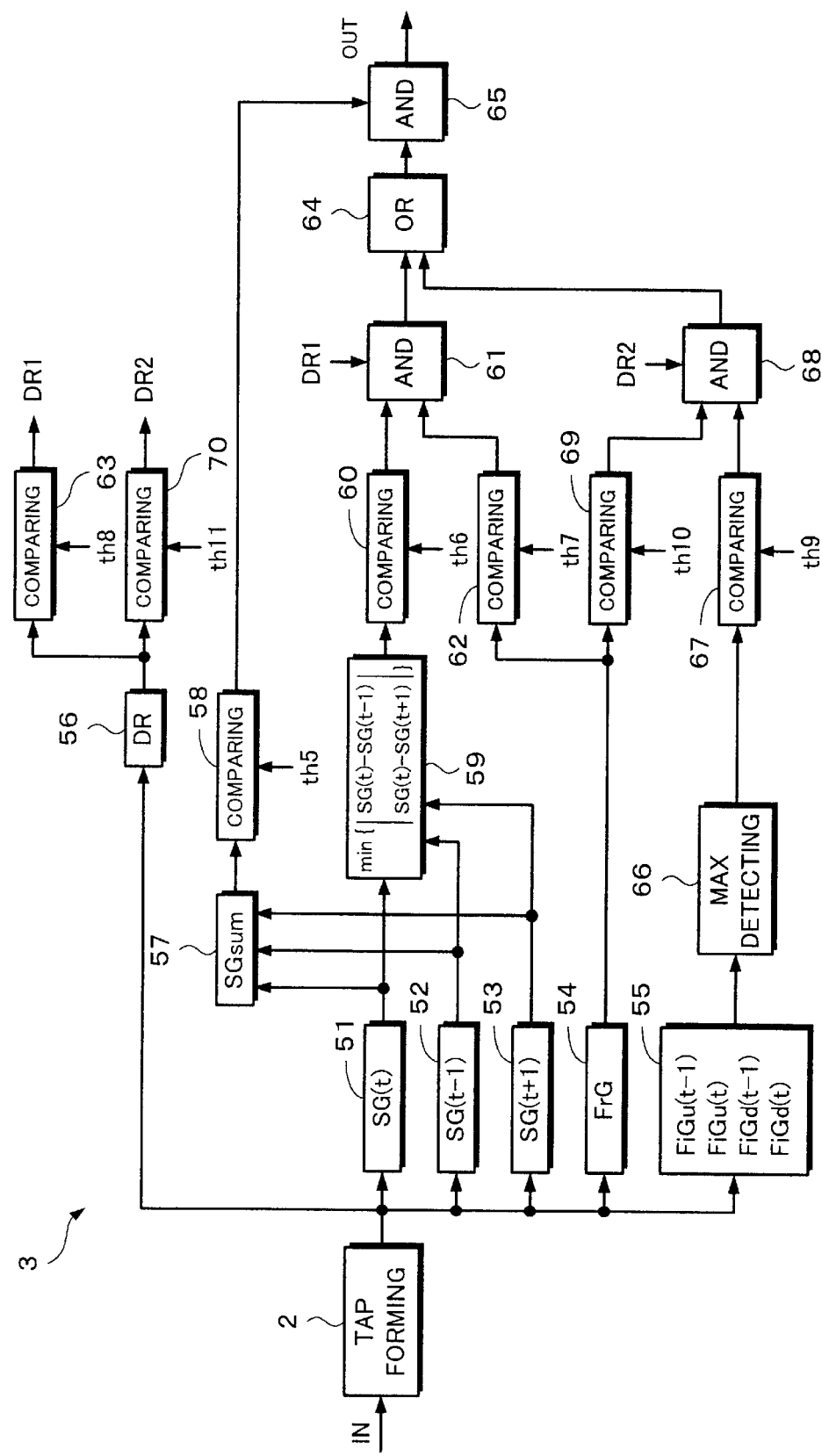
FIG. 4 is a block diagram showing an example of the structure of a telop motion detecting portion according to the embodiment of the present invention.

FIG. 4 shows an example of the structure of the telop motion detecting portion 3. The tap forming circuit 2 is connected to detecting circuits 51, 52, and 53, a frame difference FrG detecting circuit 54, a field difference detecting circuit 55, and a dynamic range DR detecting circuit 56. The detecting circuits 51, 52, and 53 detect space slopes SG(t), SG(t−1), and SG(t+1), respectively. The space slopes SG(t), SG(t−1), and SG(t+1) are space slopes of fiels at times t−1, t, and t+1 that are chronologically successive, respectively. Thus, the following relation is satisfied.

Sgsum=$SG(t-1)+SG(t)+SG(t+1)$

The frame difference FrG is the same as that used in the motion class detecting process. Thus, the detecting circuits 51, 52, 53, and 54 shown in FIG. 4 can be used in common with the detecting circuits 4 and 5 shown in FIG. 1. The dynamic range DR is the difference between the maximum value and the minimum value of taps (50 pixels) and represents a space activity.

Figure 5:
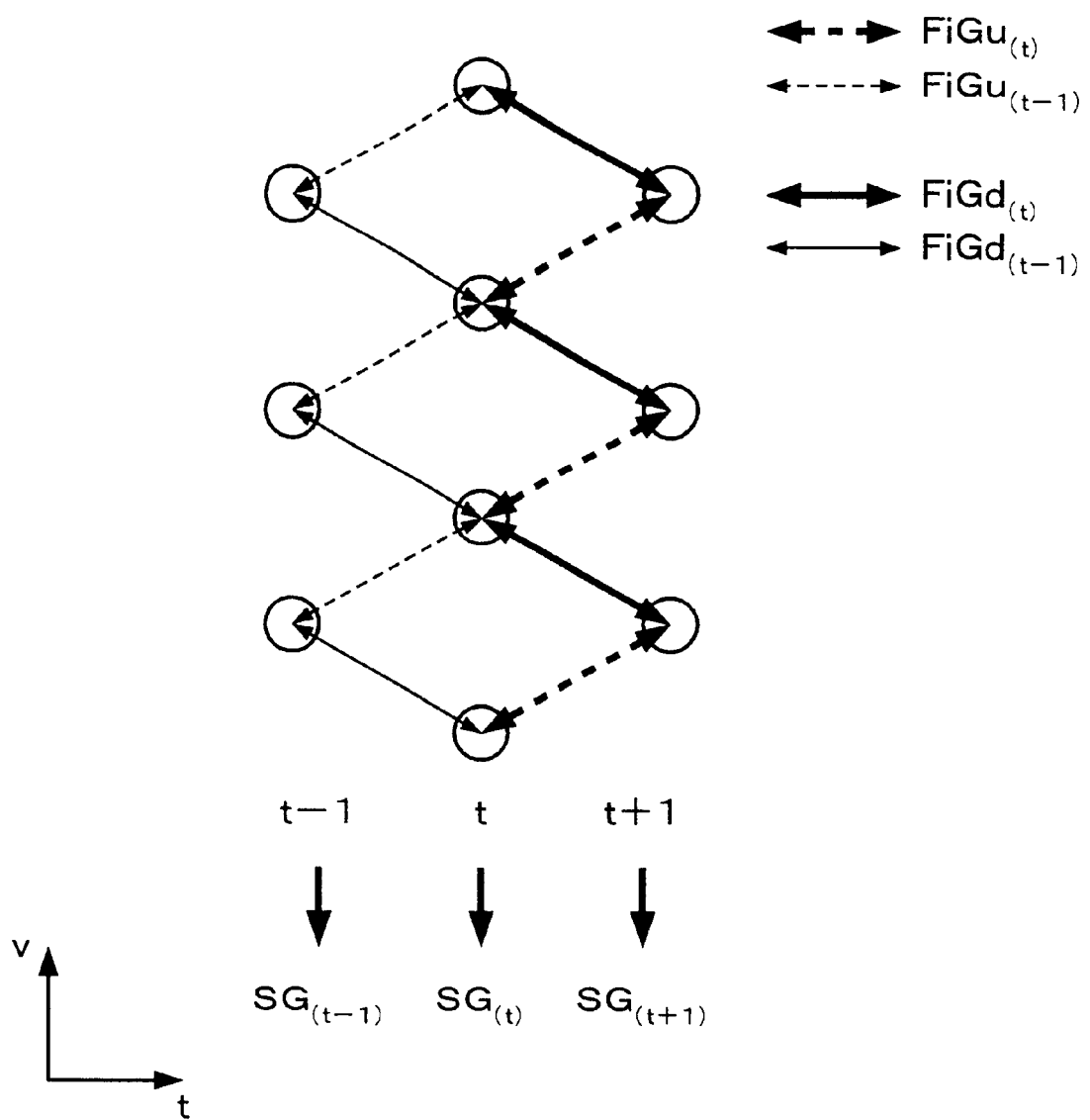
FIG. 5 is a schematic diagram for explaining field differences used in a telop determining process.

FIG. 5 is a schematic diagram for explaining the field difference. Between successive fields, in the interlace system, vertical line positions deviate. Thus, there are two types of differences. One type is a difference between a current line and an upper line of another field (this difference is represented by a suffix u). The other type is a difference between a current line and a lower line of another field (this difference is represented by a suffix d).

As is clear from FIG. 5, FiGut-1 represents an upward field difference between the field at time t−1 and the field at time t. FiGdt-1 represents a downward field difference between the field at time t−1 and the field at time t. FiGut represents an upward field difference between the field at time t and the field at time t+1. FiGdt represents a downward field difference between the field at time t and the field at time t+1. As with the frame difference FrG, the sum of the absolute values of the differences of the pixels of a block of (5×3 pixels) and a block of (5×4 pixels) (see FIG. 2) is detected as a field difference. The field difference detecting circuit 55 detects these four field differences. With the detected field differences, the field difference detecting circuit 55 detects wether or not there is a motion of a telop portion corresponding to the following determination conditions. When condition A or B is satisfied, the field difference detecting circuit 55 determines that there is a motion of a telop portion. Otherwise, the field difference detection circuit 55 determines that there is no motion of a telop portion.

A=$SG$sum≧th5 AND min{$|SG(t)-SG(t-1)|, |SG(t)-SG(t+1)|$}≧th6 AND $FrG$≧th7 AND $DR$≧th8

B=$SG$sum≧th5 AND max{$FiGu(t-1), FiGu(t), FiGd(t-1), FiGd(t)$}≧th9 AND $FiGd$≧th10 AND $DR$≧th11

The structure shown in FIG. 4 determines whether or not conditions A and B are satisfied. The space slopes SG(t), SG(t−1), and SG(t+1) at the spatially same position of the individual fields detected by the detecting circuits 52, 53, and 54 are supplied to an adding device 57, respectively. The adding device 57 calculates the sum SGsum of the space slopes SG(t), SG(t−1), and SG(t+1). The sum SGsum is supplied to a comparing device 58. The comparing device 58 compares the sum SGsum with a threshold value th5. The comparing device 58 supplies the compared result to an AND circuit 65.

The space slopes SG(t), SG(t−1), and SG(t+1) are supplied to a minimum value detecting portion 59. The minimum value detecting portion 59 detects the minimum space slope and supplies it to a comparing device 60. The comparing device 60 compares the minimum space slope with a threshold value th6. The comparing device 60 supplies the compared result to an AND circuit 61. The frame difference FrG detected by the detecting circuit 54 is supplied to a comparing device 62. The comparing device 62 compares the frame difference FrG with a threshold value th7. The comparing device 62 supplies the compared result to the AND circuit 61. The dynamic range DR detected by the detecting circuit 56 is supplied to a comparing device 63. The comparing device 63 compares the dynamic range DR with a threshold value th8. The comparing device 63 supplies the compared result (DR1) to the AND circuit 61.

All the comparing devices that include those that will be described later output 1 as the compared results when input data is larger than the respective threshold value. When the determined results of the comparing devices 60, 62, and 63 are all "1", the AND circuit 61 outputs "1". Output data of the AND circuit 61 is supplied to the AND circuit 65 through an OR circuit 64. The compared result of the comparing device 58 is supplied to the AND circuit 65. Thus, when the output data of the AND circuit 61 is "1" and the compared result of the comparing device 58 is "1", the AND circuit 65 outputs "1". Thus, when the output data of the AND circuit 65 is "1", it represents that condition A is satisfied and that there is a motion of a telop portion. When the output data of the AND circuit 65 is "0", it represents that there is no motion of a telop portion.

The field differences detected by the detecting circuit 55 are supplied to a maximum value detecting portion 66. The maximum value detecting portion 66 detects the maximum value of the four field differences and supplies the maximum field difference to a comparing device 67. The comparing device 67 compares the maximum field difference with a threshold value th9. The comparing device 67 supplies the compared result to an AND circuit 68. The frame difference FrG detected by the detecting circuit 54 is supplied to a comparing device 69. The comparing device 69 compares the frame difference FrG with a threshold value th10. The comparing device 69 supplies the compared result to the AND circuit 68. The dynamic range DR detected by the detecting circuit 56 is supplied to a comparing device 70. The comparing device 70 compares the dynamic range DR with a threshold value 11. The comparing device 70 supplies the compared result (DR2) to the AND circuit 68.

When the compared results of the comparing devices 67, 69, and 70 are all "1", the AND circuit 68 outputs "1". Output data of the AND circuit 68 is supplied to the AND circuit 65 through the OR circuit 64. The compared result of the comparing device 58 is supplied to the AND circuit 65. Thus, when the output data of the AND circuit 68 is "1" and the compared result of the comparing device 58 is "1", the AND circuit 65 outputs "1". When the output data of the AND circuit 65 is "1", it represents that condition B is satisfied and that there is a motion of a telop portion. When the output data of the AND circuit 65 is "0", it represents that there is no motion of a telop portion.

Data that represents whether or not there is a motion of a telop portion is supplied from the telop motion detecting portion 2 to the selecting circuit 6 (see FIG. 1). When the data represents that there is a motion of a telop portion, the selecting circuit 6 selects "1". When the data represents that there is no motion of a telop portion, the selecting circuit 6 selects a motion class. When values 0 to 3 of the motion class are represented by three bits, a telop class that represents that there is a motion of a telop portion is assigned three bits that are different from the motion class. The selecting circuit 6 generates the three-bit code corresponding to the output data of the telop motion detecting portion 2.

Next, with reference to FIGS. 6 and 7, another example the structure of the telop motion detecting portion 2 will be described. In this example, with field differences that have been vertically filtered, it is determined whether or not a telop portion has a motion. The tap forming circuit 2 is connected to a detecting circuit 71, a detecting circuit 72, a vertical filter 73, and a detecting circuit 74. The detecting circuit 71 detects the sum SGsum of space slopes SG(t), SG(t−1), and SG(t+1). The detecting circuit 72 detects a frame difference FrG. The detecting circuit 74 detects a dynamic range DR. The sum SGsum satisfies the following relation.

$$Sgsum = SG(t-1) + SG(t) + SG(t+1)$$

The frame difference FrG is the same as that used in the motion class detecting process. The detecting circuits 71, 72, and 74 shown in FIG. 6 can be used in common with the detecting circuits 4 and 5 shown in FIG. 1.

An output signal of the filter 73 is supplied to a subtracting device 75. An output signal of the tap forming circuit 2 is also supplied to the subtracting device 75. The subtracting device 75 calculates the difference between a field that has been vertically filtered by the vertical filter 73 and another field. A field difference generating circuit 76 generates a field difference FiG1(t). A field difference generating circuit 77 generates a field difference FiG2(t).

Figure 7:
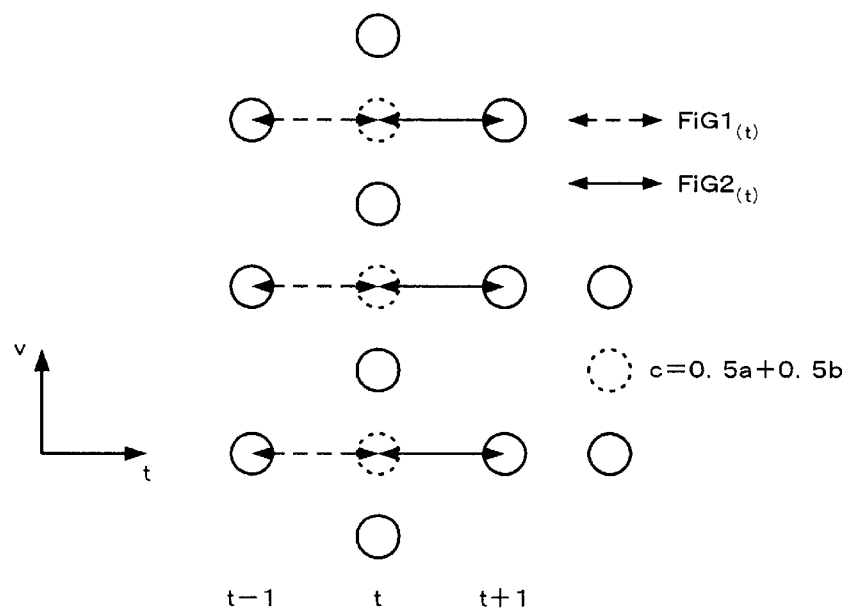
FIG. 7 is a schematic diagram for explaining field differences that have been vertically filtered in the telop determining process.

FIG. 7 is a schematic diagram for explaining a field difference. In the interlace system, lines of successive fields vertically deviate. The vertical filter 73 generates an interpolated value c that is the average value of pixels a and b of vertically adjacent lines of the field at time t as denoted by a dotted circle ($c=0.5a+0.5b$). The subtracting device 75 generates the difference between a pixel of the field at time t−1 and an interpolated value of the field at time t that is output from the filter 73 (this difference is referred to as first difference) and the difference between a pixel of the field at time t+1 and an interpolated value of the field at time t that is output from the filter 73 (this difference is referred to as second difference).

The field difference generating circuit 76 converts the first difference into the absolute value thereof. In reality, the field difference generating circuit 76 cumulates the absolute values of 15 first differences per block and generates the field difference FiG1(t). Likewise, the field difference generating circuit 77 generates the field difference FiG2(t) that is the sum of the absolute values of 15 second differences per block. With the detected field differences, it is determined whether or not there is a motion of a telop portion corresponding to the following determination conditions. When condition A or B is satisfied, it is determined that there is a motion of a telop portion. Otherwise, it is determined that there is no motion of a telop portion. The vertical filtering process may be performed for the field at time t−1 and the field at time t+1.

Figure 6:
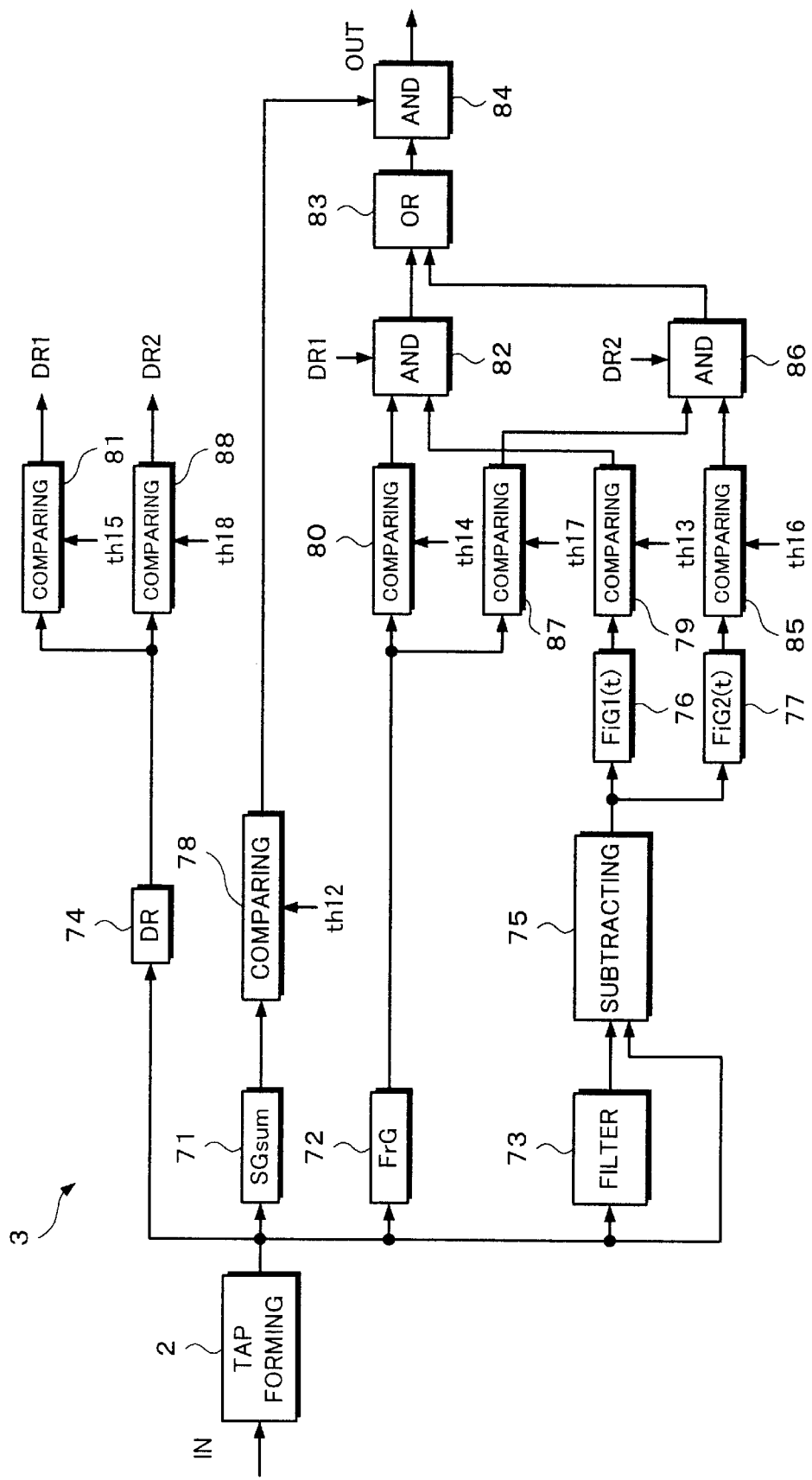
FIG. 6 is a block diagram showing another example of the structure of the telop motion detecting portion according to the embodiment of the present invention.

$A = SGsum \geq th12$ AND $FiG1(t) \geq th13$ AND $FrG \geq th14$ AND $DR \geq th15$ $B = SGsum \geq th12$ AND $FiG2(t) \geq th16$ AND $FrG \geq th17$ AND $DR \geq th18$ The structure shown in FIG. 6 determines whether or not conditions A and B are satisfied. The sum SGsum of space slopes detected by the detecting circuit 71 is supplied to a comparing device 78. The comparing device 78 compares the sum SGsum with a threshold value th12. The comparing device 78 supplies the compared result to an AND circuit 84.

The field difference FiG1(t) generated by the field difference generating circuit 76 is supplied to a comparing device 79. The comparing device 79 compares the field difference FiG1(t) with a threshold value th13. The comparing device 79 supplies the compared result to an AND circuit 82. The frame difference FrG detected by the detecting circuit 72 is supplied to a comparing device 80. The comparing device 80 compares the frame difference FrG with a threshold value th14. The comparing device 80 supplies the compared result to the AND circuit 82. The dynamic range DR detected by the detecting circuit 74 is supplied to a comparing device 81. The comparing device 81 comprares the dynamic range DR with a threshold value th15. The comparing device 81 supplies the compared result (DR1) to the AND circuit 82.

When the compared results of the comparing devices 79, 80, and 81 are all "1", the AND circuit 82 outputs "1". The output data of the AND circuit 82 is supplied to the AND circuit 84 through an OR circuit 83. The compared result of the comparing device 78 is supplied to the AND circuit 84. Thus, when the output data of the AND circuit 84 is "1" and the compared result of the comparing device 78 is "1", the AND circuit 84 outputs "1". When the output data of the AND circuit 84 is "1", it represents that condition A is satisfied and that there is a motion of a telop portion. When the output data of the AND circuit 84 is "0", it represents that there is no motion of a telop portion.

The field difference FiG2(t) generated by the field difference generating circuit 77 is supplied to a comparing device 85. The comparing device 85 compares the field difference FiG2(t) with a threshold value th16. The comparing device 85 supplies the compared result to an AND circuit 86. The frame difference FrG detected by the detecting circuit 72 is supplied to a comparing device 87. The comparing device 87 compares the frame difference FrG with a threshold value th17. The comparing device 87 supplies the compared result to the AND circuit 86. The dynamic range DR detected by the detecting circuit 74 is supplied to a comparing device 88. The comparing device 88 compares the dynamic range DR with a threshold value th18. The comparing device 88 supplies the compared result (DR2) to the AND circuit 86.

When the compared results of the comparing devices 85, 87, and 88 are all "1", the AND circuit 86 outputs "1". The output data of the AND circuit 86 is supplied to the AND circuit 84 through the OR circuit 83. The compared result of the comparing device 78 is supplied to the AND circuit 84. Thus, when the output data of the AND circuit 86 is "1" and the compared result of the comparing device 78 is "1", the AND circuit 84 outputs "1". When the output data of the AND circuit 84 is "1", it represents that condition B is satisfied and that there is a motion of a telop portion. When the output data of the AND circuit 84 is "0", it represents that there is no motion of a telop portion.

The data that represents whether or not there is a motion of a telop portion is supplied from the telop motion detecting portion 2 shown in FIG. 6 to the selecting circuit 6 shown in FIG. 1. When the data represents that there is a motion of a telop portion, the selecting circuit 6 selects "1". When the data represents that there is no motion of a telop portion, the selecting circuit 6 selects a motion class.

In the examples (shown in FIGS. 4 and 6) of the telop motion detecting portion 2, the dynamic range DR is used as a space activity. One telop detection condition is that the dynamic range DR is equal to or larger than a predetermined threshold value. However, instead of the dynamic range DR, a space activity detected by the structure shown in FIG. 8 may be used.

Figure 8:
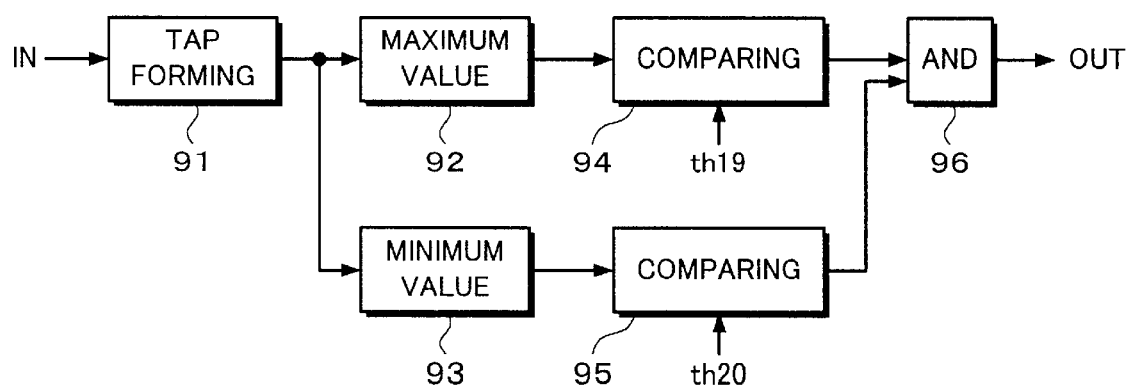
FIG. 8 is a block diagram showing the structure of a space activity detecting portion used in the telop determining process.

Referring to FIG. 8, pixel values of a plurality of taps (50 taps shown in FIG. 2) connected to a tap forming circuit 91 are supplied to a maximum value detecting circuit 92 and a minimum value detecting circuit 93. The detected maximum value and minimum value are supplied to comparing devices 94 and 95, respectively. The comparing device 94 compares the maximum value with a threshold value th19. The comparing device 95 compares the minimum value with a threshold value th20. When the maximum value is equal to or larger than the threshold value th19, the comparing device 94 generates "1". When the minimum value is equal to or larger than the threshold value th20, the comparing device 95 output "1". The comparing devices 94 and 95 supply the respective compared results to an AND circuit 96. The AND circuit 96 generates output data.

The output data of the AND circuit 96 represents that the maximum value is equal to or larger than the threshold values th19 and the minimum value is equal to or larger than the threshold value th20. Instead of the output data that represents that the dynamic range DR is equal to or larger than a predetermined threshold value, the output data of the AND circuit 96 may be used.

Figure 9:
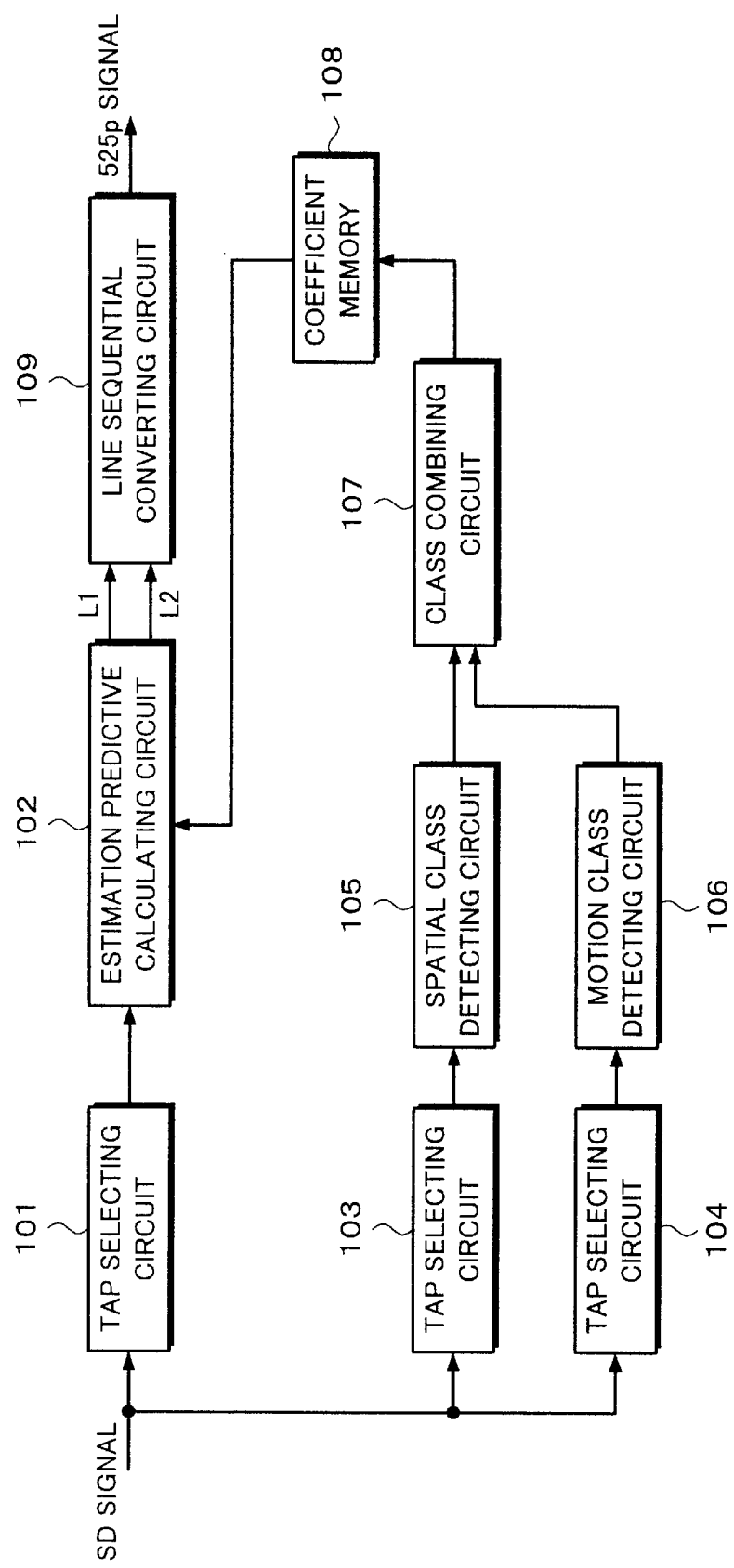
FIG. 9 is a block diagram showing an example of the structure of a picture information converting apparatus according to the present invention.

The motion determining apparatus according to the present invention can be applied for a motion class generating process of a picture signal converting apparatus. The picture signal converting apparatus inputs an SD (Standard Definition) signal and outputs an HD (High Definition) signal. When HD pixels are generated, SD pixels present in the vicinity thereof are categorized as classes. For each class, a predictive coefficient value is obtained. In such a manner, HD pixels more closer to real values can be obtained. FIG. 9 shows the structure of the picture signal converting apparatus that performs such a method.

In FIG. 9, an input SD signal (525i signal) is supplied to a first tap selecting circuit 101, a second tap selecting circuit 103, and a third tap selecting circuit 104. The first tap selecting circuit 101 selects SD pixels that are used for predicting HD pixels (the SD pixels are referred to as predictive taps). The second tap selecting circuit 103 selects SD pixels used to categorize classes corresponding to a distribution pattern of levels of SD pixels present in the vicinity of HD pixels to be generated (hereinafter, the SD pixels are referred to as spatial class taps). The third tap selecting circuit 104 selects SD pixels used to categorize classes of motion corresponding to SD pixels present in the vicinity of HD pixels to be generated (hereinafter the SD pixels are referred to as motion class taps).

Predictive taps selected by the first tap selecting circuit 101 are supplied to an estimation predictive calculating circuit 102. Spatial class taps selected by the second tap selecting circuit 103 are supplied to a spatial class detecting circuit 105. The spatial class detecting circuit 105 detects a spatial class. The detected spatial class is supplied to a class combining circuit 107. Motion class taps selected by the third tap selecting circuit 104 are supplied to a motion class detecting circuit 106. The motion class detecting circuit 106 detects a motion class. The detected motion class is supplied to a class combining circuit 107. The class combining circuit 107 combines the spatial class and the motion class and generates a final class code.

The class code is supplied as an address to a coefficient memory 108. Coefficient data corresponding to the class code is read from the coefficient memory 108. The coefficient data and the predictive taps are supplied to the estimation predictive calculating circuit 102. The estimation predictive calculating circuit 102 calculates data of an output picture signal (525p signal) corresponding to a linear estimation expression of the predictive taps (pixels of the 525i signal) and the predictive coefficients. The estimation predictive calculating circuit 102 outputs data of the current line (this data is referred to as line data L1) and data of a line to be generated (this data is referred to as line data L2). In addition, the estimation predictive calculating circuit 102 outputs pixels in the vertical direction twice as many as those in the horizontal direction. The 525i signal represents an interlace signal with 525 scanning lines. The 525p signal represents a progressive signal (non-interlace signal) with 525 scanning lines.

The line data L1 and L2 received from the estimation predictive calculating circuit 102 are supplied to a line sequential converting circuit 109. The line sequential converting circuit 109 performs a line double speed process. Since the estimation predictive calculating circuit 102 generates the 525p signal with the 525i signal, the horizontal period of the 525p signal is the same as the horizontal period of the 525i signal. The line sequential converting circuit 109 performs a line double speed process for doubling the horizontal interval. The line sequential converting circuit 109 outputs the 525p signal.

Figure 10:
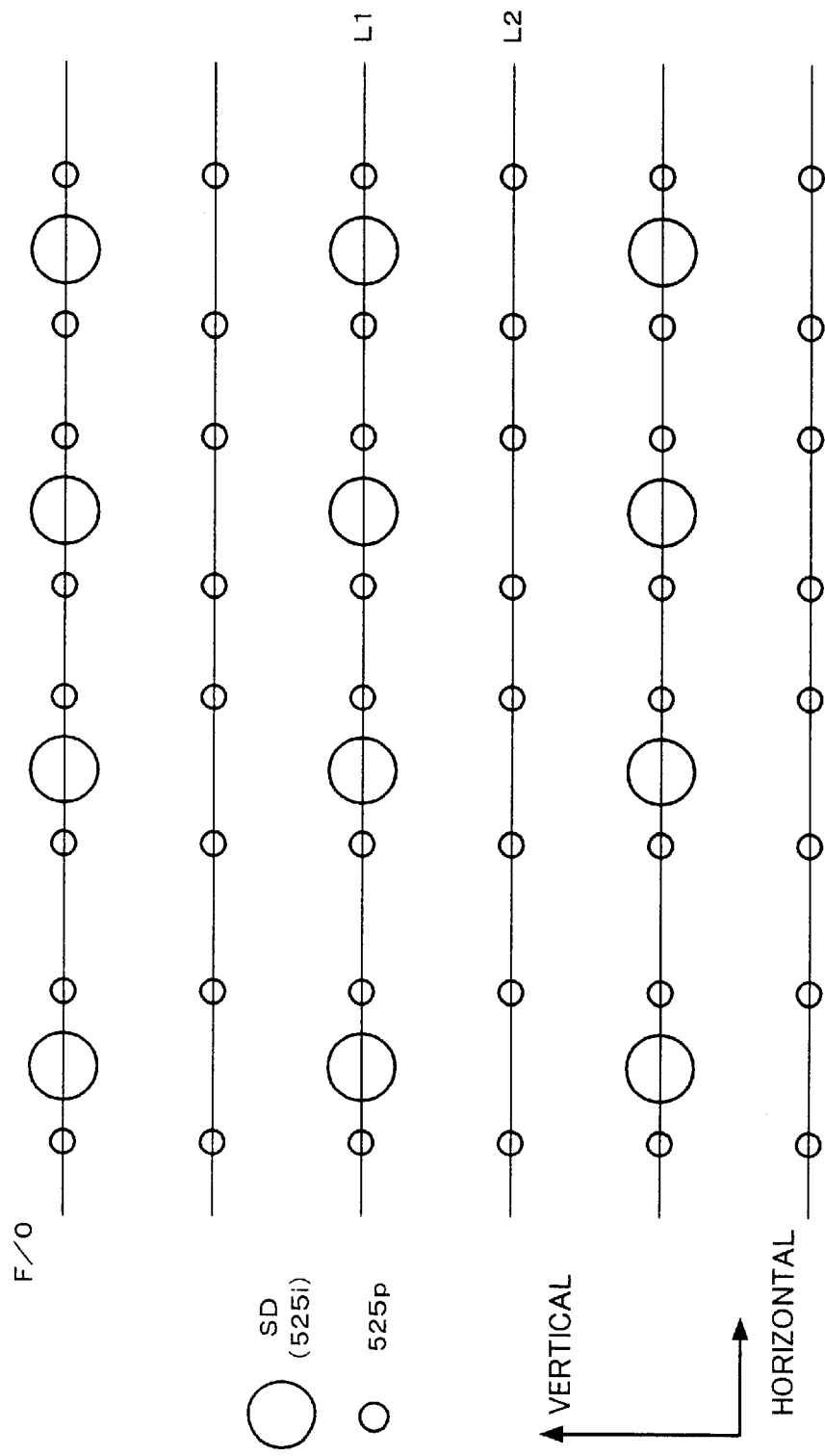
FIG. 10 is a schematic diagram for explaining the relation of positions of SD pixels and 525$p$ pixels.

FIG. 10 is an enlarged view of a part of a picture of one field. FIG. 10 shows an arrangement of pixels of a 525i signal and a 525p signal. In FIG. 10, large dots represent pixels of the 525i signal, whereas small dots represent pixels of the 525p signal. This relation applies to the other drawings. FIG. 10 shows an arrangement of pixels of an odd field (o) of a particular frame (F). In the other field (even field), lines of the 525i signal spatially deviate by 0.5 lines each. As is clear from FIG. 10, line data L1 at the same position of each line of the 525i signal and line data L2 at the center position of the upper and lower lines thereof are generated. The number of pixels of each line in the horizontal direction is twice as many as that in the vertical direction. Consequently, the estimation predictive calculating circuit 102 generates data of four pixels of the 525p signal at a time.

Figure 11:
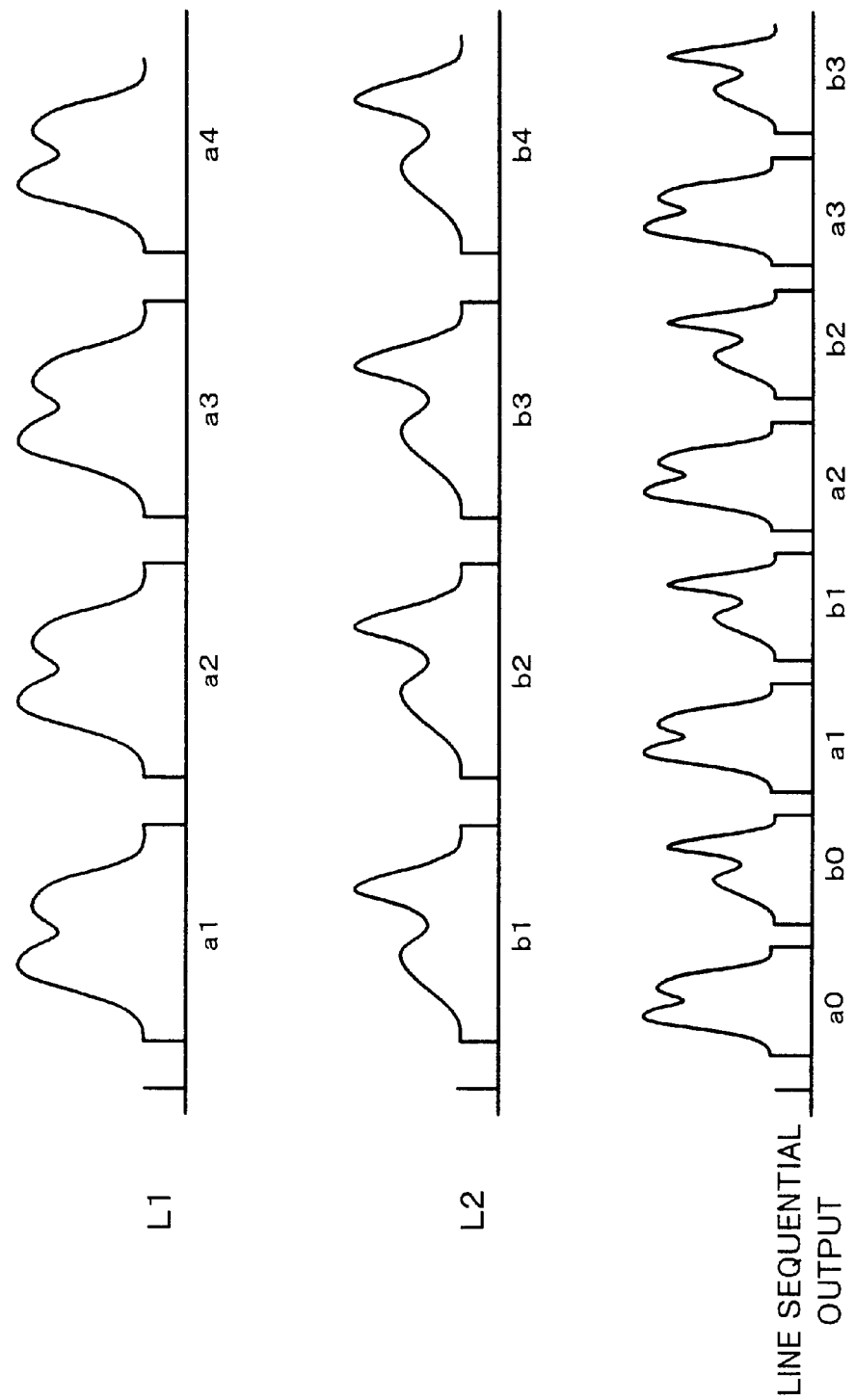
FIG. 11 is a schematic diagram showing waveforms for explaining a line sequential converting process.

FIG. 11 shows analog waveforms in the line double speed process. The estimation predictive calculating circuit 102 generates line data L1 and L2. The line data L1 contains lines a1, a2, a3, and so forth arranged in the order. The line data L2 contains lines b1, b2, b3, and so forth contained in the order. The line sequential converting circuit 109 compresses data of each line in the time axis direction by ½. The line sequential converting circuit 109 alternately selects the compressed data of each line and generates line sequential data (a0, b0, a1, b1, and so forth).

The output picture signal is supplied to a CRT displaying unit (not shown). The CRT displaying unit has a synchronizing system corresponding to the output picture signal (525p signal). The input picture signal is a broadcast signal or a reproduction signal of a reproducing unit such as a VCR. The apparatus according to the embodiment of the present invention can be built in a television receiver.

Figure 12:
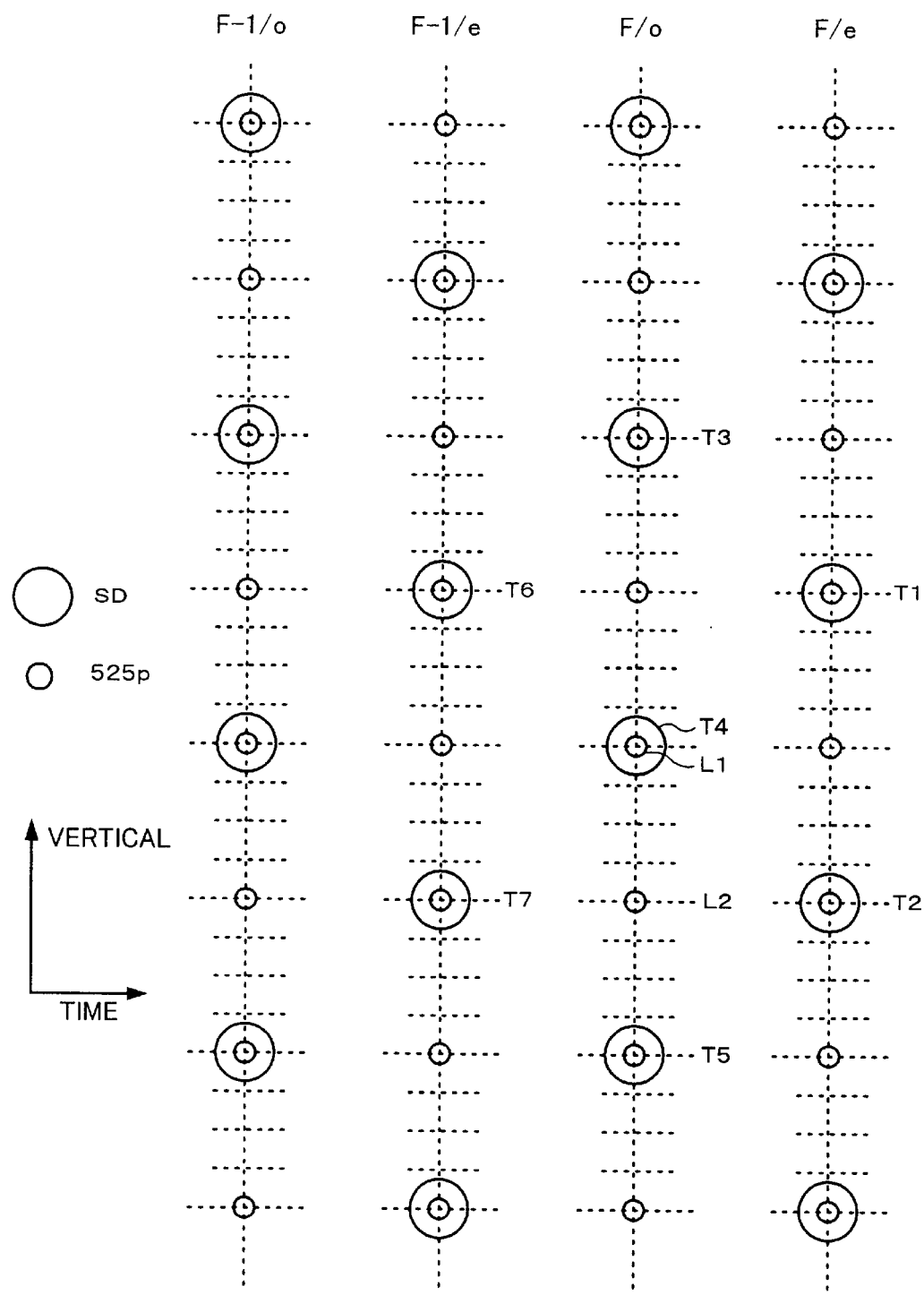
FIG. 12 is a schematic diagram showing the relation of positions of SD pixels and 525$p$ pixels and an example of spatial class taps.

FIG. 12 shows taps (SD pixels) selected by the second tap selecting circuit 103. FIG. 12 shows an arrangement of pixels in the vertical direction of an odd field of a frame F-1 (this field is denoted by F-1/o), an even field thereof (this field is denoted by F-1/e), an odd field of a frame F (this field is denoted by F/o), and an even field thereof (this field is denoted by F/e) that are chronologically sequential.

As shown in FIG. 12, spatial class taps for predicting line data L1 and line data L2 of the field F/o are input pixels T1 and T2, input pixels T3, T4, and T5, and input pixels T6 and T7. The input pixels T1 and T2 are contained in the field F/e and present spatially in the vicinity of pixels of the 525$p$ signal to be generated. The input pixels T3, T4, and T5 are contained in the field F/o and present in the vicinity of pixels of the 525$p$ signal to be generated. The input pixels T6 and T7 are contained in the field F-1/e. When the line data L1 and the line data L2 of the field F/e are predicted, likewise, taps are selected. In mode 1 for predicting pixels of the line data L1, the pixel T7 may not be selected as a class tap. In mode 2 for predicting pixels of the line data L2, the pixel T4 may not be selected as a class tap.

The motion determining apparatus according to the present invention is applied for the motion class detecting circuit 106. Thus, taps selected by the tap selecting circuit 104 (namely, motion class taps) are 50 SD pixels shown in FIG. 2. As described above, the telop class or motion class MJ is determined. The determined class is supplied as a motion class to the class combining circuit 107. In this case, a class that represents that there is a motion of a telop portion is designated. Alternatively, a class that represents that there is a motion of a telop portion is designated as one of a plurality of classes that represent the amount of the motion of the telop portion.

Spatial class taps selected by the tap selecting circuit 103 are supplied to the spatial class detecting circuit 105. The spatial class detecting circuit 105 detects a pattern of a level distribution of the selected spatial class taps. In this case, the spatial class detecting circuit 105 compresses eight-bit SD data of each pixel to two-bit SD data. For example, the spatial class detecting circuit 105 compresses data of SD pixels as spatial class taps corresponding to ADRC (Adaptive Dynamic Range Coding) method. As information compressing means, another compressing means such as DPCM (predictive encoding method) or VQ (vector quantizing method) may be used instead of the ADRC method.

The ADRC method is an adaptively re-quantizing method developed for a high efficient encoding process for use with a VCR (Video Cassette Recorder). Since the ADRC method allows a local pattern of a signal level to be effectively represented with a short word length, according to the embodiment of the present invention, the ADRC method is used to generate a spatial class categorization code. In the ADRC method, the length between the maximum value MAX and the minimum value MIN is equally divided by a designated bit length and re-quantized corresponding to the following formula (1).

$$DR=MAX-MIN+1$$

$$Q=\{(L-MIN+0.5) \times 2/DR\} \quad (1)$$

where DR represents the dynamic range of spatial class taps; L represents the data level of the pixel of each spacial class tap; Q represents a requantized code; and { } represents a truncating process.

By learning the relation between the pattern of a 525$i$ signal and the pattern of a 525$p$ signal, the obtained predictive coefficient for each class is stored to the predictive coefficient memory 108. The predictive coefficient is information for converting the 525$i$ signal into the 525$p$ signal corresponding to a linear estimation expression. The method for obtaining the predictive coefficient will be described later.

A predictive coefficient corresponding to a class is read from a relevant address of the coefficient memory 108. The predictive coefficient is supplied to the estimation predictive calculating circuit 102. The estimation predictive calculating circuit 102 calculates a liner combination expression (formula (2)) with predictive taps (pixel values) T1, T2, . . . and Ti received from the tap selecting circuit 101 and predictive coefficients w1, w2, . . . , and wi and obtains line data L1 and L2. It should be noted that the predictive coefficient of the line data L1 is different from the predictive coefficient of the line data L2.

$$L1=w1T1+w2T2+ \ldots +wiTi \quad (2)$$

In such a manner, a predictive coefficient is pre-learnt for each class and stored to the predictive coefficient memory 108. Corresponding to predictive taps and predictive coefficients, output data corresponding to input data is calculated and output. Thus, unlike with an interpolating process for input data, a high quality progressive picture signal can be obtained.

Figure 13:
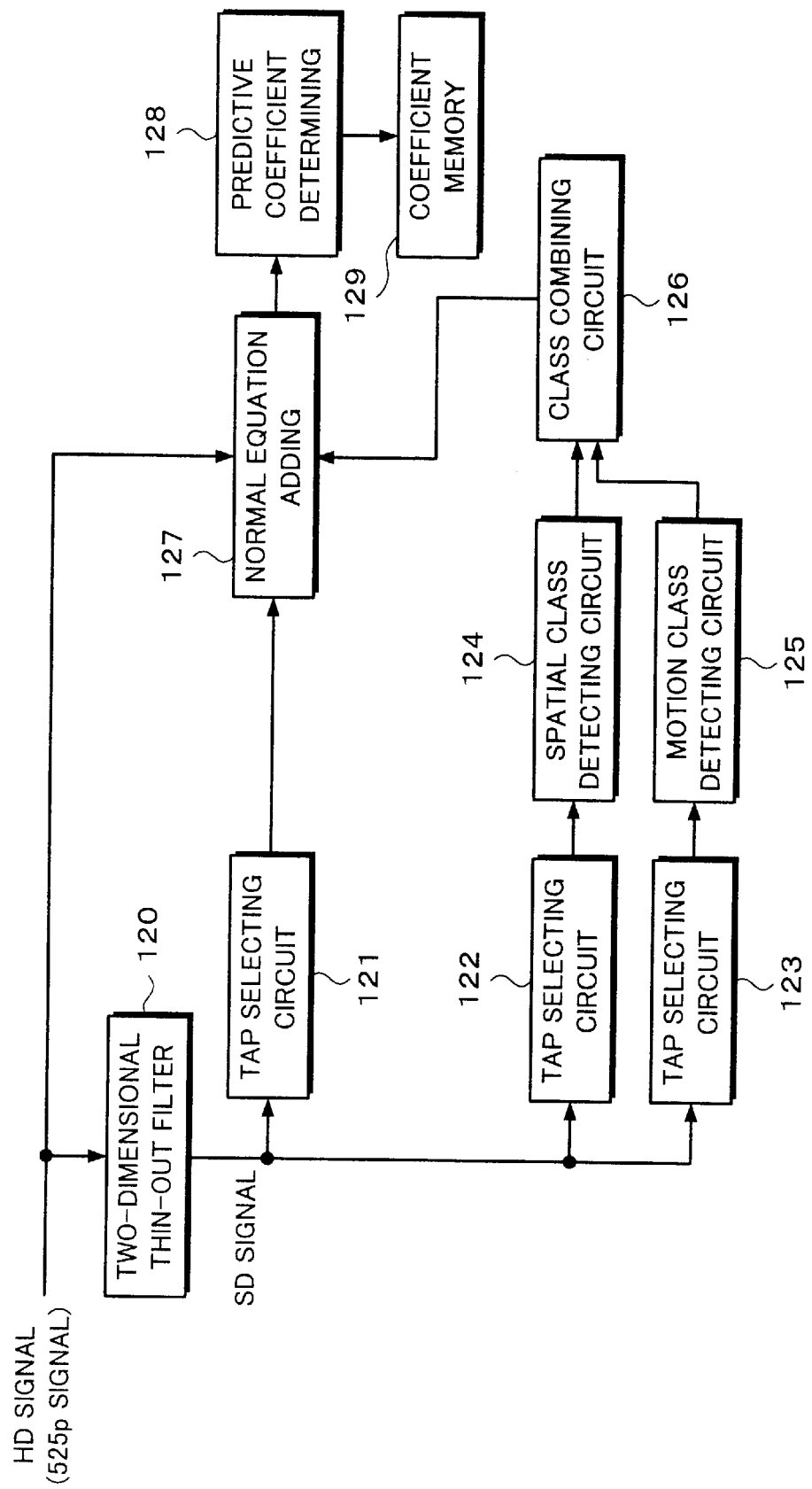
FIG. 13 is a block diagram showing an example of the structure for obtaining coefficient data.

Next, with reference to FIG. 13, a (learning) method for generating coefficient data stored in the coefficient memory 108 will be described. To learn coefficient data, an SD picture corresponding to a known HD picture (a 525$p$ signal) is generated by a two-dimensional thin-out filter 120 (in this case, the number of pixels of the SD picture is ¼ that of the HD picture). For example, pixels in the vertical direction of HD data are thinned out by a vertical thin-out filter so that the frequency in the vertical direction of the field is halved. In addition, pixels in the horizontal direction of HD data are thinned out by a horizontal thin-out filter.

An SD signal that is output from the two-dimensional thin-out filter 120 is supplied to a tap selecting circuit 121, a tap selecting circuit 122, and a tap selecting circuit 123. As with the tap selecting circuits 101, 103, and 104 of the signal converting apparatus shown in FIG. 9, the tap selecting circuits 121, 122, and 123 select predictive taps, spatial class taps, and motion taps, respectively. The predictive taps are supplied from the tap selecting circuit 121 to a normal equation adding circuit 127. The spatial class taps are supplied from the tap selecting circuit 122 to a spatial class detecting circuit 124. The motion class taps are supplied from the tap selecting circuit 123 to a motion class detecting circuit 125.

As with the spatial class detecting circuit 105 of the signal converting apparatus, the spatial class detecting circuit 124 compresses data of the spatial class taps corresponding to the ADRC method and generates a spatial class code. As with the motion class detecting circuit 106 of the signal converting apparatus, the motion class detecting circuit 125 generates a motion class code with the motion class taps. A class combining circuit 126 combines the spatial class code and the motion class code and generates a final class code. The final class code is supplied from the class combining circuit 126 to the normal equation adding circuit 127.

Next, to explain the operation of the normal equation adding circuit 127, a process for learning a conversion expression for converting a plurality of SD pixels into one HD pixel and a signal converting process using a prediction expression thereof will be described. First of all, for explaining the learning process, a predicting process using n pixels will be described. A liner estimation expression with n taps of coeficient data w1, . . . , and wn for each class is given by the formula (3). Before learning, wi is an undefined coefficient.

$$y = w1 \times 1 + w2 \times 2 + \ldots + wn \times n \quad (3)$$

where x1, x2, ..., and xn represent levels of SD pixels selected as predictive taps; and y represents the level of an HD pixel.

A plurality of signals of data are learnt for each class. When the number of pieces of data is m, the following formula (4) is given corresponding to the formula (3).

$$yk = w1 \times k1 + k2 + \ldots + wn \times kn \quad (4)$$

where k=1, 2, ... m.

In the case of m>n, since predictive coefficients wi, ..., and wn are not uniquely given, elements of an error vector are defined by the following formula (5). A predictive coefficient that minimizes the solution of the formula (6) is obtained. In other words, least square method is used.

$$ek = yk - \{w1 \times k1 + w2 \times k2 + \ldots + wn \times kn\} \quad (5)$$

where k=1, 2, ..., m.

$$e^2 = \sum_{k=0}^{m} e_k^2 \quad (6)$$

Next, a partial differential coefficient of the formula (6) with respect to wi is obtained. To do that, the coefficients wi are obtained so that the solution of the following formula (7) become "0".

$$\frac{\partial e^2}{\partial w_i} = \sum_{k=0}^{m} 2\left(\frac{\partial e_k}{\partial w_i}\right) e_k = \sum_{k=0}^{m} 2 x_{id} \cdot e_k \quad (7)$$

Next, when Xij and Yi are defined as the following formulas (8) and (9), the formula (7) can be represented as a matrix expressed by the following formula (10).

$$X_{ji} = \sum_{p=0}^{m} x_{pi} \cdot x_{pj} \quad (8)$$

$$Y_i = \sum_{k=0}^{m} x_{ki} \cdot y_k \quad (9)$$

$$\begin{bmatrix} x_{11} & x_{12} & \cdots & x_{1n} \\ x_{12} & x_{22} & \cdots & x_{2n} \\ \cdots & \cdots & \cdots & \cdots \\ x_{n1} & x_{n2} & \cdots & x_{nn} \end{bmatrix} \begin{bmatrix} w_1 \\ w_2 \\ \cdots \\ w_n \end{bmatrix} - \begin{bmatrix} Y_1 \\ Y_2 \\ \cdots \\ Y_n \end{bmatrix} \quad (10)$$

The formula (10) is generally referred to as normal equation. The normal equation adding circuit 127 shown in FIG. 13 performs the addition of the normal equation with class information received from the class combining circuit 126, predictive taps received from the tap selecting circuit 121, and pixels (a teacher signal) of a progressive picture to be generated.

After data of frames sufficient for the learning process has been input, the normal equation adding circuit 127 outputs normal equation data to the predictive coefficient determining portion 128. The predictive coefficient determining portion 128 solves the normal equation data with respect to wi using a conventional matrix solution such as sweep-out method and obtains predictive coefficients. The predictive coefficient determining portion 128 writes the obtained predictive coefficients to a predictive coefficient memory 129.

As a result of the learning process, predictive coefficients that allow values that are the statistically closest to the real value of the considered pixel Y of the progressive picture to be predicted for individual classes are stored to the predictive coefficient memory 129. The predictive coefficients stored in the predictive coefficient memory 129 are loaded to the predictive coefficient memory 108 of the picture signal converting apparatus.

Thus, the learning process for generating the progressive picture data with the interlace picture data corresponding to the linear estimation expression is completed.

Although the number of scanning lines used in the apparatus according to the embodiment of the present invention is 525, however, it is an example. In other words, the present invention can be applied for an output picture signal with another scanning line structure. For example, as shown in FIG. 14, the present invention can be applied to a signal converting process for converting a 525$i$ signal into a 1050$i$ signal (a 1050-line interlace signal).

Next, the class categorizing process and the adaptive process will be briefly described.

First, the class categorizing process will be described.

Figure 15A:
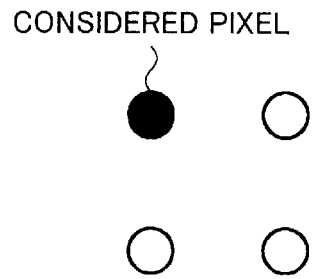
FIGS. 15A and 15B are schematic diagrams for explaining a class categorization adaptive process.
Figure 15B:
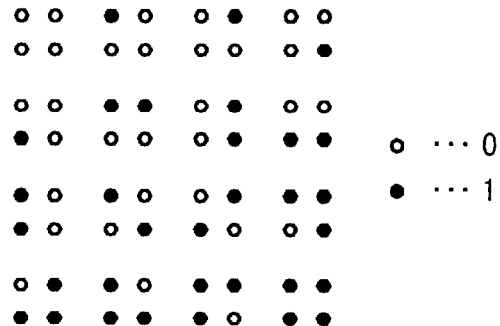

As shown in FIG. 15A, with a considered pixel and three pixels adjacent thereto, a block of (2×2 pixels) (this block is referred to as class categorization block) is formed. In this case, each pixel is represented by one bit ("0" or "1"). In this case, the block of (2×2 pixels) can be categorized as 16 (=$(2^1)^4$) patterns. Such a pattern categorizing process is performed as a class categorizing process by the class categorizing circuit 45.

The class categorizing process may be performed in consideration of an activity (that represents the complexity) of a picture (of the block).

Normally, each pixel is assigned for example eight bits. As described above, in this embodiment, a class categorization block is composed of nine (3×3) pixels with a considered pixel present at the center thereof. Thus, when the class categorizing process is performed for such a class categorization block, a huge number of classes of $(2^8)^9$ are obtained.

Thus, in the embodiment, the ADRC process is performed for a class categorization block. Consequently, the number of bits of each pixel composing the class categorization block (thus, the number of classes) is reduced.

Figure 16A:
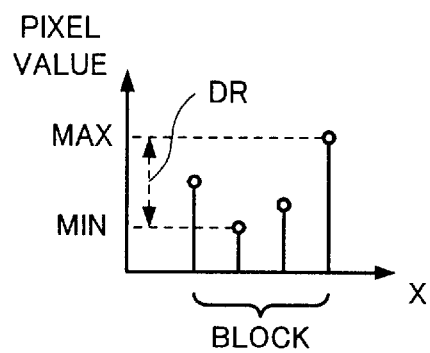
FIGS. 16A and 16B are schematic diagrams for explaining a bit reducing process of pixels that compose a class categorization block.

For simplicity, as shown in FIG. 16A, a block composed of four pixels arranged on a straight line is considered. In the ADRC process, the maximum value and the minimum value of the pixel values of the four pixels are detected. The difference between the maximum value and the minimum value is defined as a local dynamic range (namely, DR=MAX−MIN). Corresponding to the dynamic range DR, the pixel value of each pixel composing the block is re-quantized to K bits.

Figure 16B:
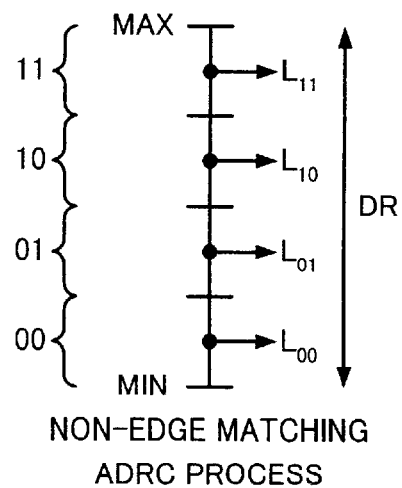

In other words, the minimum value MIN is subtracted from each pixel value of the block. The resultant value is divided by DR/$2^k$. The resultant value is converted into an ADRC code. In the case of K=2, as shown in FIG. 16B, it is determined whether or not the resultant value is categorized as any region of which the dynamic range DR is divided by 4 (=$2^2$). When the resultant value is categorized as the lowest level region, the second lowest level region, the third lowest level region, or the highest level region, a two-bit code 00B, 01B, 10B, or 11B is assigned (where B represents a binary notation). In the decoding apparatus, the ADRC code 00B, 01B, 10B, or 11B is converted into $L_{00}$, $L_{01}$, $L_{10}$, or $L_{11}$, respectively (where $L_{00}$ is the center value of the lowest level, $L_{01}$ is the center value of the second lowest level, $L_{10}$ is the center value of the third lowest level, and $L_{11}$ is the center value of the highest level). By adding the resultant value and the minimum value, the decoding process is performed.

Such an ADRC process is referred to as non-edge matching process.

The ADRC process is described in for example U.S. Pat. No. 5,0049,990 that was granted to the applicant of the present invention.

When the ADRC process is performed with a smaller number of bits assigned to each pixel composing the block, the number of classes can be reduced.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A motion determining apparatus for detecting a motion of a partial picture of an input picture signal, comprising:

a first motion detecting portion for comparing a frame difference detected for the partial picture with a predetermined threshold value and determining that the partial picture has a motion when the frame difference is larger than the threshold value;

a second motion detecting portion for comparing a frame difference detected for the partial picture with a predetermined threshold value, comparing a field difference detected for the partial picture with a predetermined threshold value, and determining that there is a motion of an artificial picture when the frame difference and the field difference are larger than the respective threshold values; and an output portion for forming motion determination data with determination data that is output from said first motion detecting portion and said second motion detecting portion.

2. The motion determining apparatus as set forth in claim 1, wherein said output portion separately outputs the determination data of said first motion detecting portion and the determination data of said second motion detecting portion, and wherein said output portion outputs the determination data of said second motion determining portion with higher priority when the determination data of said second motion detecting portion represents that there is a motion of an artificial picture.

3. The motion determining apparatus as set forth in claim 1, wherein said first motion detecting portion generates a plurality of types of determination data corresponding to the amount of the motion of the partial picture, and wherein said output portion combines the determination data of said first motion detecting portion and the determination data of said second motion detecting portion and outputs the resultant data.

4. The motion determining apparatus as set forth in claim 1, wherein the partial picture is an interlace picture, and wherein the difference between a field of a considered pixel and each of fields adjacent thereto is used as the field difference.

5. The motion determining apparatus as set forth in claim 4, wherein one of the field of the considered pixel and each of the adjacent fields is vertically filtered so as to obtain the field difference.

6. The motion determining apparatus as set forth in claim 1, wherein said first motion detecting portion determines whether or not there is a motion of the partial picture using a space activity.

7. The motion determining apparatus as set forth in claim 1, wherein said second motion detecting portion determines whether or not there is a motion of the partial picture using a space activity.

8. A motion determining method for detecting a motion of a partial picture of an input picture signal, comprising the steps of:

(a) comparing a frame difference detected for the partial picture with a predetermined threshold value and determining that the partial picture has a motion when the frame difference is larger than the threshold value;

(b) comparing a frame difference detected for the partial picture with a predetermined threshold value, comparing a field difference detected for the partial picture with a predetermined threshold value, and determining that there is a motion of an artificial picture when the frame difference and the field difference are larger than the respective threshold values; and (c) forming motion determination data with determination data that is output at steps (a) and (b).

9. A picture information converting apparatus for converting an input picture signal into a plurality of output picture signals with different scanning line structures, comprising:

first data selecting means for selecting a plurality of first pixels of the input picture signal, the positions of the first pixels being present in the vicinity of pixels of an output picture signal to be generated;

second data selecting means for selecting a plurality of second pixels of the input picture signal, the positions of the second pixels being present in the vicinity of pixels of an output picture signal to be generated;

third data selecting means for selecting a plurality of third pixels of the input picture signal, the positions of the third pixels being present in the vicinity of pixels of an output picture signal to be generated;

memory means for storing pre-obtained estimation expression coefficients;

signal generating means for generating pixels of an output picture signal with the plurality of first pixels selected by said first data selecting means and a linear estimation expression of the estimation expression coefficients;

class determining means for forming a spatial class corresponding to the plurality of second pixels selected by said second data selecting means, forming a motion class corresponding to the plurality of third pixels selected by said third data selecting means, and supplying the estimation coefficients to said signal generating means corresponding to class information as a combination of the spatial class and the motion class;

scanning line structure converting means, connected to said signal generating means, for converting the input picture signal into an output picture signal with a designated scanning line structure; and a motion determining portion for forming the motion class, wherein said motion determining portion has:
- a first motion detecting portion for comparing a frame difference detected for the partial picture with a predetermined threshold value and determining that the partial picture has a motion when the frame difference is larger than the threshold value,
- a second motion detecting portion for comparing a frame difference detected for the partial picture with a predetermined threshold value, comparing a field difference detected for the partial picture with a predetermined threshold value, and determining that there is a motion of an artificial picture when the frame difference and the field difference are larger than the respective threshold values, and
- an output portion for forming motion determination data with determination data that is output from said first motion detecting portion and said second motion detecting portion.

10. The picture information converting apparatus as set forth in claim 9, wherein a progressive output picture signal is generated with an interlace input picture signal.

11. The picture information converting apparatus as set forth in claim 9, wherein an output picture signal of which the number of pixels in the vertical direction is twice as many as that of the input picture signal is generated.

12. The picture information converting apparatus as set forth in claim 9, wherein the prediction coefficients are pre-learnt so that the error between a generated value and the true value of each of the pixels becomes minimum when pixels of an output picture signal are generated corresponding to the linear estimation expression.

* * * * *